US010023106B2

(12) United States Patent
Gresch

(10) Patent No.: US 10,023,106 B2
(45) Date of Patent: Jul. 17, 2018

(54) ARRANGEMENT FOR CONTROLLING A LIGHTING DEVICE OF A WORKING VEHICLE

(71) Applicant: Deere & Company, Moline, IL (US)

(72) Inventor: Valentin Gresch, Ensheim (DE)

(73) Assignee: DEERE & COMPANY, Moline, IL (US)

( * ) Notice: Subject to any disclaimer, the term of this patent is extended or adjusted under 35 U.S.C. 154(b) by 73 days.

(21) Appl. No.: 15/250,307

(22) Filed: Aug. 29, 2016

(65) Prior Publication Data

US 2017/0066365 A1    Mar. 9, 2017

(30) Foreign Application Priority Data

Sep. 3, 2015    (DE) .................. 10 2015 216 883

(51) Int. Cl.
*B60Q 1/24*    (2006.01)
*B60Q 1/14*    (2006.01)

(52) U.S. Cl.
CPC .............. *B60Q 1/143* (2013.01); *B60Q 1/24* (2013.01); *B60Q 2200/38* (2013.01); *B60Q 2300/314* (2013.01)

(58) Field of Classification Search
CPC ...... B60Q 1/143; B60Q 1/24; B60Q 2200/38; B60Q 2300/314; H05B 37/02; H05B 33/08
USPC .............................. 315/77–82, 291, 307, 308
See application file for complete search history.

(56) References Cited

U.S. PATENT DOCUMENTS

| 8,624,504 | B2 * | 1/2014 | Starkey | B60Q 1/323 |
| | | | | 315/131 |
| 2014/0258928 | A1 * | 9/2014 | Brush | G06F 3/0482 |
| | | | | 715/810 |

FOREIGN PATENT DOCUMENTS

| DE | 10217398 A1 | 1/2003 |
| DE | 102007007385 A1 | 8/2008 |
| DE | 102007013810 A1 | 10/2008 |
| DE | 102010052825 A1 | 5/2012 |
| DE | 102014211712 A1 | 2/2015 |
| EP | 1004230 A2 | 5/2000 |
| EP | 2158799 A1 | 3/2010 |
| EP | 2402213 A2 | 1/2012 |
| EP | 2548430 A1 | 1/2013 |
| EP | 2746105 A1 | 6/2014 |

OTHER PUBLICATIONS

European Search Report in foreign counterpart application No. 16184258.8 dated Jan. 23, 2017 (7 pages).

* cited by examiner

*Primary Examiner* — Jimmy Vu

(57) ABSTRACT

In accordance with an example embodiment, an arrangement for controlling a lighting device of a working vehicle where the lighting device is directed toward an adjustable operating element of the working vehicle. A control device is connected to the lighting device. The control device is operated to switch the lighting device on according to a detected adjustment of the operating element.

9 Claims, 1 Drawing Sheet

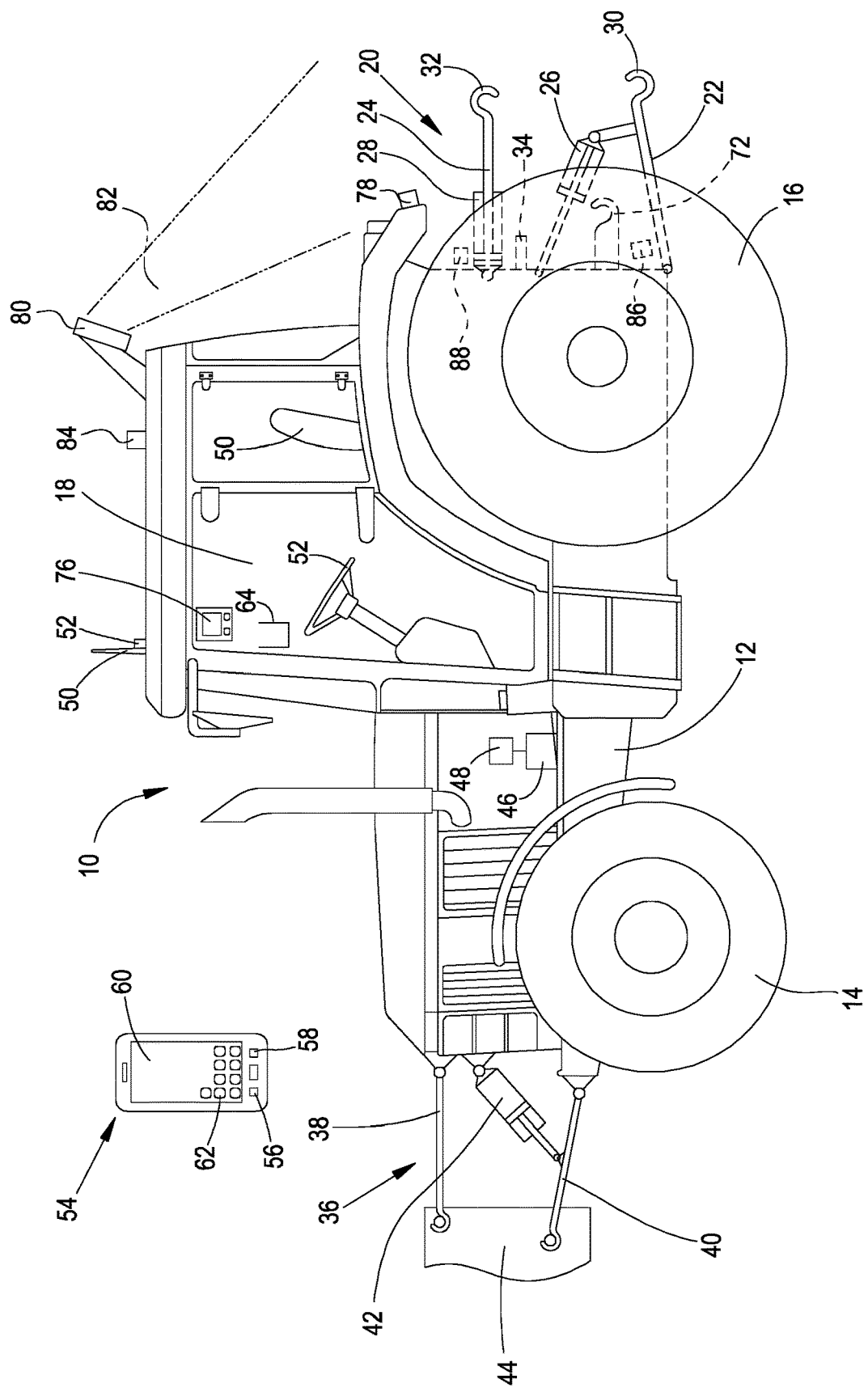

ARRANGEMENT FOR CONTROLLING A LIGHTING DEVICE OF A WORKING VEHICLE

RELATED APPLICATION

This claims priority to German patent application number 102015216883.2, filed Sep. 3, 2015.

TECHNICAL FIELD

The present disclosure generally relates to an arrangement for controlling a lighting device of a working vehicle.

BACKGROUND

In agriculture, working vehicles, in particular, tractors, are utilized for different tasks, for example, for tillage, for applying material such as seeds or fertilizer, on a field, for harvesting work, or for hauling work. Thus, different implements must be coupled to the working vehicle, such as plows, sowing machines, fertilizer spreaders, balers, mowing implements, attached forage harvesters or hauling trailers. The working vehicles are therefore equipped with one or more interfaces, at which different implements can be attached. Such interfaces can include a trailer hitch for attaching, e.g., a hauling trailer or a baler, a rear three-point hitch on the rear side of the working vehicle and/or a three-point hitch on the front side of the working vehicle, each of which is used for attaching implements that are not coupled via a tow bar, e.g., mowing implements, forage harvesters, fertilizer spreaders, sowing machines, or plows.

When attaching the implements, initially the working vehicle must be driven into a suitable position with respect to the implement. Subsequently, the couplings must be adjusted in such a way that connecting elements between the working vehicle and the implement can be closed. Finally, the connecting elements are then closed, in order to establish a temporary coupling of the implement to the working vehicle. In the prior art, these steps are carried out at an operator workstation of the working vehicle. Thus, the operator initially drives the working vehicle to a suitable point in the vicinity of the implement and then adjusts the coupling with respect to the working vehicle by actuating input elements disposed at the operator workstation for controlling external force-actuated actuators for adjusting the coupling. Finally, the implement is then locked at the coupling, which takes place either via remote control from the operator workstation or directly at the spot via manual action by the operator. In this case, it is not easy for the operator to achieve the correct position of the coupling with respect to the implement from his operator workstation, in particular in darkness or at twilight. Therefore, the operator often must climb down from his operator workstation in order to look at the interface and then, after returning to the operator workstation, carry out corresponding inputs for controlling the actuator. In the end, coupling the implements is highly time-consuming in many cases.

Arrangements have already been proposed, in which additional input elements for influencing the position of couplings and for selecting a gear ratio, including a neutral position of a power take-off drive, are installed on a rear fender of the working vehicle (e.g., DE 10 2005 003 325 A1), which input elements can be actuated by an operator standing behind or at the side of the working vehicle. In addition, wired or wireless remote controls for agricultural working nvehicles were proposed, with which the operator can control, inter alia, a hydraulic lifting unit and a power take-off shaft from outside the operator workstation (EP 1 004 230 A2, DE 102 17 398 A1, DE 10 2014 211 712 A1). As a result of these operating options, the visibility of the interface is improved but is not always sufficient for effectuating a problem-free coupling of the implement at twilight or in darkness. The lighting of the working vehicle that is usually present (DE 10 2007 013 810 A1, EP 2 402 213 A2) is designed to illuminate the surroundings of the working vehicle and, optionally, of the implement during road travel or field work and does not illuminate the interface particularly well.

In addition to the aforementioned implement interfaces of the working vehicles, it is also necessary, in the case of harvesting machines, for example, to adjust operating elements of the actual working vehicle, for example, the threshing concave gap or the size of the sieve opening in the case of a combine harvester. If these adjustments are not intended to be carried out from the operator workstation, but rather at the spot (either purely manually or by means of an external force-actuated actuator), the operator needs a flashlight, at twilight or in darkness, in order to see the adjustment, or a fixedly installed lighting device (cf. DE 10 2007 007 385 A1 for the lighting of a returns conveyor) is installed, which is switched on by means of a switch, which first must be located.

Lighting devices for working vehicles have also been described, which are controlled by means of a light sensor control and a motion detector, in order to make it easier for the operator to arrive at and leave the workstation in darkness by illuminating the access path (DE 10 2010 052 825 A1, EP 2 548 430 A1). The aforementioned problem is not solved as a result.

SUMMARY

The problem addressed by the invention is considered to be that of making it easier for the operator of a working vehicle to visually monitor an adjustable operating element of the working vehicle, in particular, in darkness or at twilight, which element is not sufficiently illuminated in the prior art.

The present invention is defined by the claims.

An arrangement for controlling a lighting device of a working vehicle comprises a lighting device, which is directed toward an adjustable operating element of the working vehicle, and a control device, which is connected to the lighting device and can be operated to switch the lighting device on according to a detected adjustment of the operating element.

In other words, the control device automatically detects when an adjustment of the operating element is carried out and, precisely when an adjustment takes place, switches on the lighting device directed toward the operating element. In this manner, an illumination of the adjusted operating element takes place automatically, which makes it substantially easier for the operator to visually monitor the procedure for adjusting the operating element. Work safety is also improved.

The control device can also be connected to a device for detecting the intensity of the ambient light and can be operated to activate the lighting device on the basis of signals from the device for detecting the intensity of the ambient light only at twilight or in darkness.

In one possible embodiment, the control device can be supplied with a piece of information, which is ascertained by sensors, regarding the position of the operating element, which is actuated manually or by means of external force. The particular position of the operating element is therefore ascertained by a sensor connected to the control device. As soon as the operating element is adjusted, the signal from the sensor changes and the control device activates the lighting device. In the case of an external force-actuated operating element, the sensor can deliver a feedback value to a closed-loop control for monitoring the position of the operating element. This closed-loop control can take place by means of the control or a regulating device separate therefrom.

In another embodiment, the control device can be supplied with a piece of information regarding a control signal for controlling an external force-actuated actuator for adjusting the operating element. These embodiments can be combined with the aforementioned embodiment, e.g., when the operating element is both actuated by means of external force and is manually adjustable.

The control device can be connected to an operator input device and the actuator, and can be operated to control the actuator on the basis of signals from the operator input device. The operator input device can be fixedly installed at the operator workstation of the working vehicle or can be fixedly installed on the working vehicle, adjacent to the operating element, or can be a hand-held device.

The operating element can be an interface on the working vehicle for attaching an implement. In another embodiment, however, the operating element can also be a crop-processing element of a harvesting machine, or any other type of adjustable element of the working machine, including an implement coupled thereto, such as a row marker of a sowing machine. In this case, the working vehicle having the implement is considered to be the working vehicle in the sense of the claims.

The control device is preferably designed to allow the lighting device to remain switched on for a specified length of time after the detected end of the adjustment of the operating element.

The present invention can be utilized on working vehicles of any type, such as agricultural working vehicles in the form of, e.g., tractors or harvesting machines, or construction machines.

BRIEF DESCRIPTION OF THE DRAWINGS

The detailed description of the drawings refers to the accompanying figure in which:

At least one example embodiment of the subject matter of this disclosure is understood by referring to FIG. 1 of the drawings.

FIG. 1 illustrates a side view of a tractor.

DETAILED DESCRIPTION

An agricultural working vehicle 10 in the form of a tractor is represented in FIG. 1, which is built on a frame 12 and is supported on the ground by means of front, steerable wheels 14 and drivable, rear wheels 16. The operator workstation is located in a cab 18.

A rear three-point hitch 20 is disposed at the rear end of the frame 12, which hitch is formed from two lower control arms 22, which are disposed next to one another, and one upper control arm 24. The lower control arms 22 are height-adjustable by means of actuators 26 in the form of hydraulic cylinders. The upper control arm 24 is length-adjustable by means of an actuator 28 in the form of a hydraulic cylinder. By adjusting the actuators 26, the rear ends of the lower control arms 22 can be brought into a position in which they can be coupled to any type of implement (not shown). Coupling points 30 in the form of link hooks (or any other type of coupling points, e.g., coupling eyes, of the type described in DIN ISO 730-1 Agricultural machines and tractors—Rear-mounted three-point linkage—Part 1: Categories 1, 2, 3 and 4), are disposed at the rear end of the lower control arms 22 in a manner known per se, whereas an upper control arm coupling point 32, which is also conventional, is provided at the rear end of the upper control arm 24.

In addition, a power take-off shaft 34 for driving moving elements of the implement is installed on the rear side of the frame 12.

A front three-point hitch 36 is disposed at the front end of the frame 12, which hitch comprises two lower control arms 40, each of which is height-adjustable by means of an actuator 42. The front three-point hitch 36 also comprises an upper control arm 38, which is represented here as non-height-adjustable. The control arms 38, 40 are connected to any type of implement 44.

A control device 46 is electrically connected to a valve unit 48, which, in turn, hydraulically controls, inter alia, the actuators 26, 28, 42. The control device 46 is also connected to a transmitter/receiver module 52, which has an antenna 50.

A portable hand-held device 54 comprises a processor 56, a transmitter/receiver module 58, a preferably touch-sensitive display device 60, and a keypad 62. The processor 56 communicates with the control device 46 via the transmitter/receiver module 58 and the transmitter/receiver module 52 in order to transmit commands to the working vehicle 10 for the actuators 26, 28, 42, which commands are input via the keypad 62, which is used as an input means, and/or the touch-sensitive display device 60. The transmitter/receiver modules 52, 58 can communicate with one another via any standard (e.g., for cellular phones, such as GSM or UMTS; or computer networks, e.g., WLAN or Bluetooth).

The hand-held device 54 can be designed as a commercially available tablet computer or as a smartphone. Software runs on said device in order to carry out the described function, which software was downloaded as an app from an Internet address, after an authentication, in a manner known per se. If the hand-held device 54 is not needed as a remote control, it can be inserted into a holder 64 in the cab 18, which functions as a docking station and in which the rechargeable batteries of the hand-held device 54 are charged. In the holder 64, the hand-held device 54 can be used as an input device for controlling any functions of the working vehicle 10 and, in particular, can emulate a virtual terminal according to ISO 11783.

The hand-held device 54 can be used as a remote control in order to simplify the coupling of an implement 44 at one of the implement interfaces of the working vehicle 10. For this purpose, the working vehicle 10 is initially driven into the vicinity of the implement 44, until it is located sufficiently close to the implement 44 in order to couple it. The operator, who has the hand-held device 54, then leaves his operator workstation in the cab 18 and moves into the vicinity of the particular interface in question. The operator then actuates the input means of the hand-held device 54 in order to bring the control arms 22, 24, 38, 40 into a suitable position and, finally, locks the implement 44 on the control arms 22, 24 or 38, 40, either manually or by means of further actuators (not shown), which are controlled by means of the hand-held device 54 in the manner described. In an analogous manner, the power take-off shaft 34 can also be switched on and off by means of the hand-held device 54, or a power-take off drive can be brought into a neutral position. In addition, a fixed or adjustable coupling 72 for a tow bar can also be opened and closed via the computer 54 and, optionally, can be adjusted in terms of its position.

The adjustment of the actuators 26, 28, 42 can also take place via a user interface 76, which is fixedly installed in the cab 18 and is connected to the control unit 46, or by means of a push-button 78 on the rear fender, which push-button is connected to the control unit 46.

In order to make it easier for the operator to couple the implement to the rear three-point hitch 20, a lighting device 80 is installed above, on the cab 18, which lighting device is operated by the on-board power supply of the working vehicle 10 and is controlled by the control device 46. When the lighting device is switched on, a light cone 82 emitted by the lighting device 80 illuminates the three-point hitch 20 and, in particular, its coupling points 30, 32. When a device 84, connected to the control device 46 for detecting the intensity of the ambient light signals to the control device 46 that the available daylight or ambient light is not sufficiently bright (e.g., as bright as the light from the lighting device 80 at the coupling points 30, 32), and one of the actuators 26, 28 is adjusted, the control device 46 activates the lighting device 80. This control can be based on the control commands issued to the control device 46. These commands are issued by the hand-held device 54 or by the user interface 76 or by the push-button 78 to the control device 46, or said control can be based on signals from actuator position sensors 86, 88, which ascertain the position of the actuators 26, 28 and signalize said position to the control device 46 for closed-loop control and/or display purposes. After the final adjustment, the control device 46 leaves the lighting device 80 on for a certain length of time and then switches it off.

It would also be possible to direct an analogous lighting device (not shown) onto the front three-point hitch 36 and activate it during an adjustment of the front three-point hitch, or to adjust the lighting device 80 shown via the control device 46 by means of a suitable drive and, if necessary, direct it toward the front three-point hitch.

What is claimed is:

1. An arrangement for controlling a lighting device of a working vehicle, comprising:
   a lighting device directed toward an adjustable operating element of the working vehicle;
   a sensor configured to sense adjustment of the operating element; and
   a control device configured to receive signals from the sensor, the control device connected to the lighting device and configured to switch the lighting device on according to a detected adjustment of the operating element based on the received signals.

2. The arrangement of claim 1, wherein the control device is connected to a device for detecting the intensity of ambient light and operable to selectively activate the lighting device corresponding to availability of ambient light.

3. The arrangement of claim 1, wherein the sensor is an actuator position sensor, the actuator position sensor is configured to sense a position of the operating element, the operating element is configured to be actuated by an actuator, and the actuator is configured to be manually triggered or triggered by an external force.

4. The arrangement of claim 3, wherein the control device is configured to receive a control signal for controlling the actuator and adjusting the operating element.

5. The arrangement of claim 1, wherein the control device is connected to an operator input device and an actuator and configured to control the actuator on the basis of signals from the operator input device.

6. The arrangement of claim 5, wherein the operator input device is fixedly installed at an operator workstation of the working vehicle, is fixedly installed on the working vehicle adjacent to the operating element, or is a hand-held device.

7. The arrangement of claim 1, wherein the operating element is an interface for attachment of an implement.

8. The arrangement of claim 1, wherein the control device is designed to allow the lighting device to remain switched on for a specified length of time after detecting an end of the adjustment of the operating element.

9. The arrangement of claim 1, wherein the arrangement is part of the working vehicle.

* * * * *